July 19, 1949. W. K. LUETY 2,476,312
PROJECTING AND MAGNIFYING CONTOUR COMPARATOR
Filed Oct. 1, 1946 3 Sheets-Sheet 1

INVENTOR.
WILLIAM KARL LUETY.
BY
ATTORNEYS

July 19, 1949.   W. K. LUETY   2,476,312
PROJECTING AND MAGNIFYING CONTOUR COMPARATOR
Filed Oct. 1, 1946   3 Sheets-Sheet 2

INVENTOR.
WILLIAM KARL LUETY.
BY
ATTORNEYS

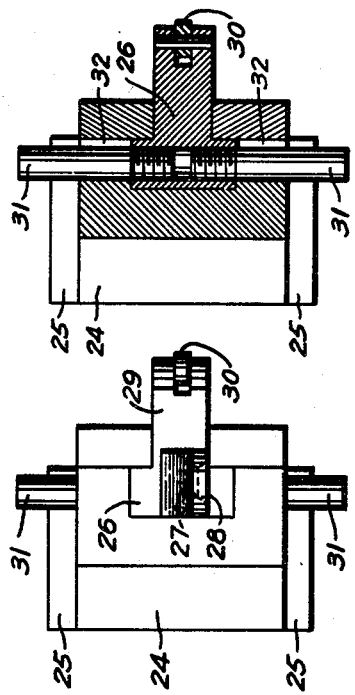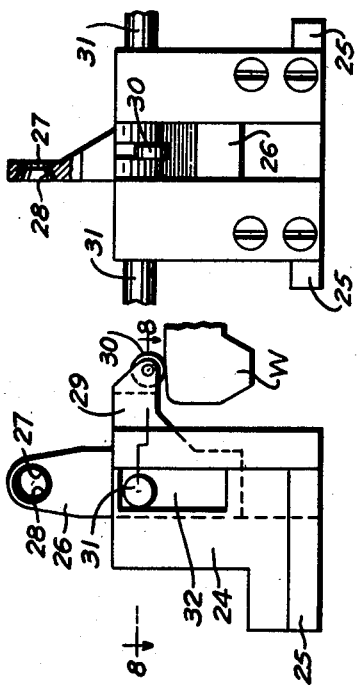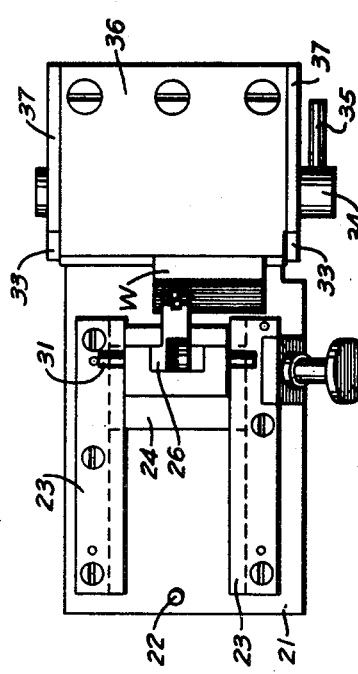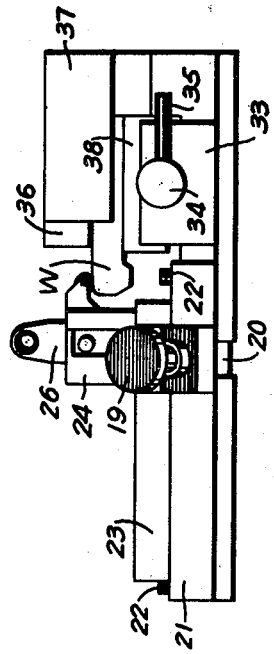

Patented July 19, 1949

2,476,312

UNITED STATES PATENT OFFICE 2,476,312

PROJECTING AND MAGNIFYING CONTOUR COMPARATORS

William Karl Luety, Honeoye Falls, N. Y.

Application October 1, 1946, Serial No. 700,543

3 Claims. (Cl. 88—24)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to optical projecting and magnifying gages also called comparators.

It is an object of this invention to provide in such a gage having a projecting and magnifying optical system, a gaging member having a cylindrical gaging roller journaled on the gaging member for rotating movement and adapted to be manually engaged with that profile of the component or work piece which is to be measured, said gaging member also having a cylindrical opening through it, the external diameter of the gaging roller being equal to the internal diameter of the opening, and the opening being located in the rays of light passing through the optical system so that the movement of the gaging roller over the profile or surface being gaged is magnified and reproduced on the screen or viewing member of the optical system.

A further object to which this invention is directed is the provision of a comparator-type gage capable of gaging a contour or profile which is impossible or difficult to illuminate directly or which is too wide to be accurately gaged by projecting light across it.

Additional objects of the present invention are to provide a gage employing optical methods, which gage is simple, efficient and convenient to operate; which is economical to purchase and maintain; and which can be applied to and used in conjunction with existing gages so as to extend the field of usefulness of such gages to include the measurement of surfaces or profiles over which direct rays of light cannot be passed at all or can only be passed with so much expense of time and effort as to render efforts to use optical methods to gage such surfaces or profiles impractical.

One embodiment of this invention is disclosed in the annexed drawings and specification to which reference is here made for a further and fuller exposition of this invention.

In the drawings:

Fig. 3 is a top plan view of the gaging member and associated work-piece-holding clamp.

Fig. 4 is a side elevation of the parts shown in Fig. 3.

Fig. 5 is a top plan view of the gaging member on an enlarged scale.

Fig. 6 is a side elevation of the gaging member shown in Fig. 5.

Fig. 7 is a front elevation of these parts.

Fig. 8 is a horizontal cross section on line 8—8 of Fig. 6 as viewed in the direction of the arrows.

Figure 1:
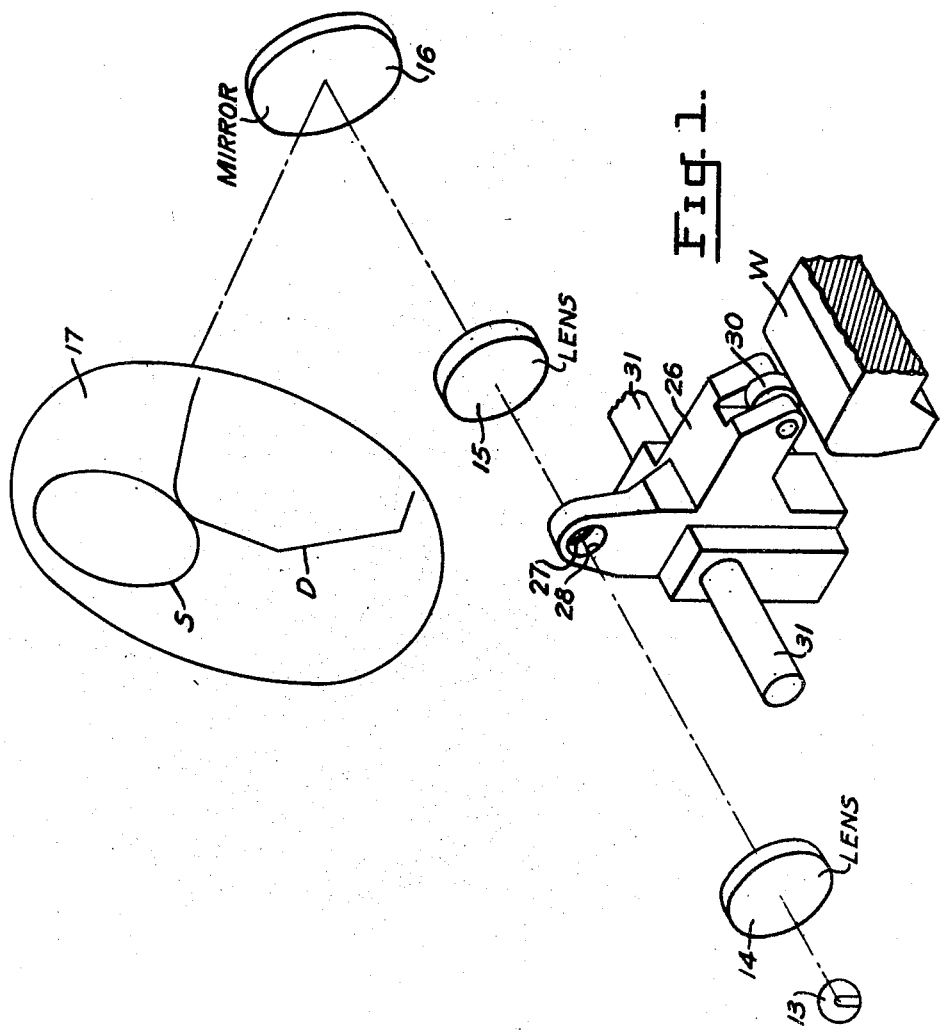
Fig. 1 is a schematic view showing the work piece to be gaged, the gaging member, and the optical system.
Figure 2:
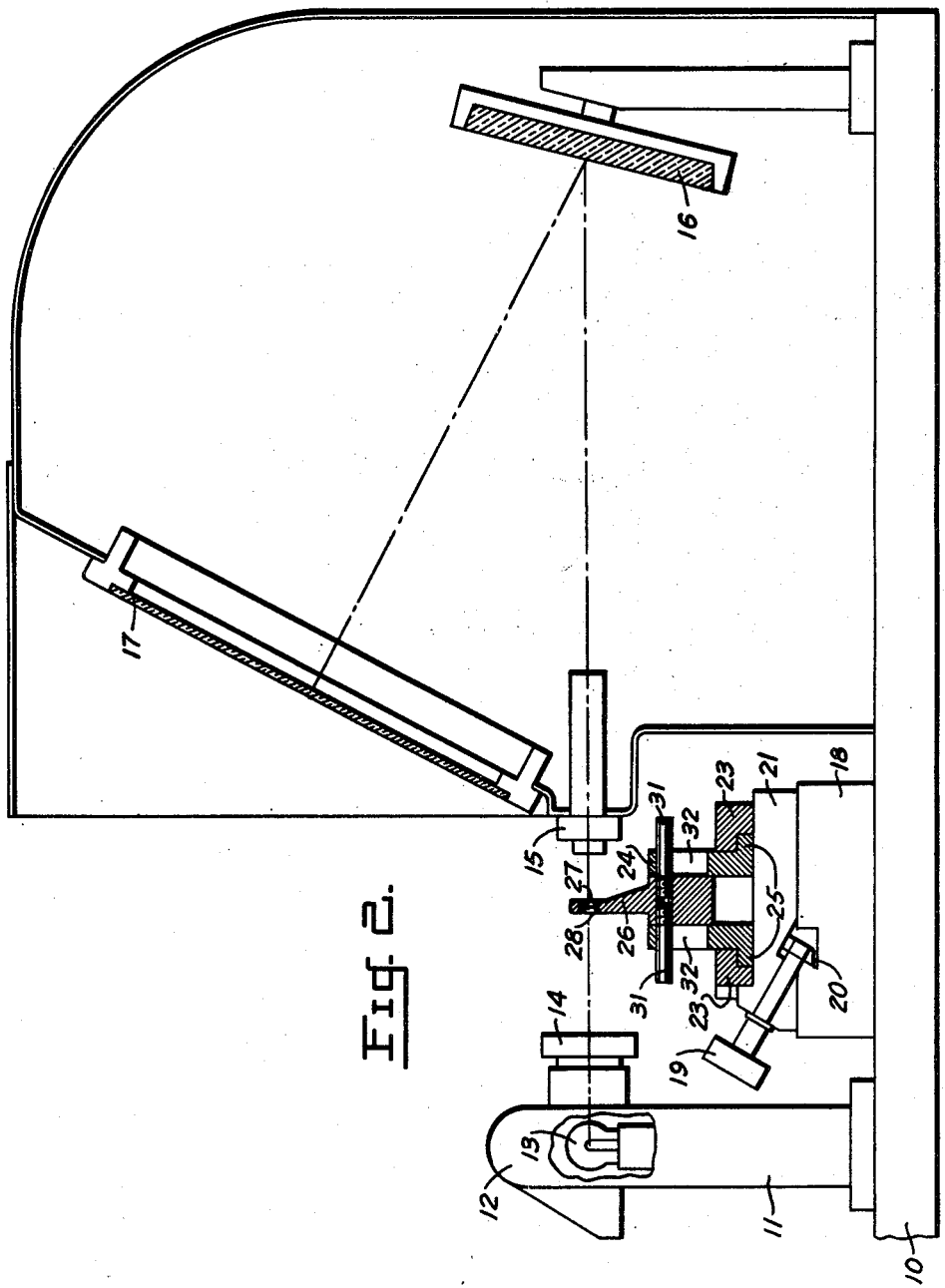
Fig. 2 is a view of the device with parts shown in vertical longitudinal cross section.

One selected embodiment of the present invention is shown in Fig. 2. It comprises a base or support 10 on which is mounted a lamp standard 11 terminating in a hood 12. Hood 12 is broken away in Fig. 2 to disclose electric lamp 13 or other light source mounted in hood 12. Hood 12 also supports condensing lens 14 through which a beam of non-parallel rays of light passes from source 13 out of hood 12. Lens 14 forms part of the optical system of the gage which also includes objective lens 15, mirror 16 and the translucent screen or viewing member 17.

The gaging member is mounted so that it has a perforated portion movable between condensing lens 14 and objective lens 15. The base or support 10 carries a foundation 18 on which the gaging member is secured by a stud 19 and a locking screw 20 (Fig. 4).

As is shown more specifically in Figs. 3-8, the gaging member comprises a gage base 21 on which is mounted a pin 22 forming a stop and a pair of horizontal guide rails 23. Fig. 2 shows that gage body 24 has on its bottom face or surface outstanding flanges 25 which underlie and slide along the guiding rails 23. Mounted in the gage body 24 for sliding movement vertically thereof is gaging member 26.

Gaging member 26 has an upstanding arm which is perforated by a cylindrical opening 27 which communicates with a frusto-conical opening 28 on the side facing the condensing lens 14 or the side from whiuh the light enters the cylindrical opening 27. Gaging member 26 also has a horizontally extending arm 29 in which is journaled a gage roller 30 for rotating movement. The internal diameter of cylindrical opening 27 and the external diameter of gage roller 30 are the same. A pair of operating pins 31 are secured to gaging member 26 by screw threads or other convenient means. Operating pins 31 project through vertically elongated slots 32 in the gage body 24. In the illustrated embodiment of the present invention the gaging member 26 has its two arms joined together to present a substantially right-angled form; however, it will be obvious that practically any other angular form will be suitable so long as the gage roller 30 is on one arm and the cylindrical opening 27 is on the other arm of the gaging member.

The gaging member also includes a work-piece-holding clamp or staging fixture by means of which a work piece W is held in position to be gaged. This clamp comprises a support 33 in which is journaled a cam shaft 34 provided with a projecting handle 35. A top member 36 having depending sides 37 is also mounted on gage base 21. Work piece W is clamped up against the top member 36 by the rotation of cam shaft 34 which causes the cams (not shown) on the cam shaft to engage a movable table 38 and clamp the work piece W between the top of the movable table 38, the bottom of the top member 36, and the inner faces of the sides 37. Thus the work piece W is accurately and firmly secured in a definite position.

The mode of operation of the gage of this invention is as follows. With the work piece W firmly and accurately located in the clamp or staging fixture and the source 13, which provides the illumination for the optical system, lighted, the operator takes one or both of the operating pins 31 in his fingers and moves the gaging member 24 horizontally along the guide rails 23 and vertically in the gage body 24 so that the gage roller 30 engages the work piece W. The gage member 26 is then moved so that the gage roller 30 travels over that contour or profile of the work piece W which is to be gaged. This travel of the gaging member 26 causes the openings 27—28 to move in the beam of light passing through the optical system from the condensing lens 14 to the objective lens 15. This causes a bright spot of light S to move about the screen 17. On screen 17 has been placed a drawing D or other magnified representation of the contour or profile of the work piece W which is to be gaged. The operator is thus easily able to determine whether the work piece W conforms to the desired shape or not. If desired, the representation D may be made with two lines representing the maximum and minimum tolerances of the work piece W which will be accepted.

From the foregoing it will be seen that this invention provides a projecting and magnifying gage which is easily and simply operated to measure or compare the profile or contour of a work piece even though it would be difficult or impossible to pass direct rays of light over the contour or profile which is to be measured.

I claim:

1. In a gage for measuring a profile of a work piece and having an optical system providing a magnified indication, a gage element, including, a body having a first slide in it, a carriage movably mounted in said first slide and having in it a second slide at right angles to said first slide, an angular gaging member comprised of two arms having an end of each arm joined together, said gaging member further having at the free end of one arm a gaging cylinder for engaging that profile of the work piece which is to be measured and still further having on the other arm an opening through it located in and movable transversely of the light axis of the optical system, said opening having a bounding surface of the same size curvature as the convex curved outline of said gaging cylinder, and a handle on said gaging member for moving said gaging member in said slides with the gaging cylinder in contact with the profile to be measured so that the travel of the opening reproduces in said optical system the travel of the gaging cylinder over the profile being measured.

2. In a gage for measuring a profile of a work piece and having an optical system providing a magnified indication, a gage element, including, a body having a first slide in it, a carriage movably mounted in said first slide and having in it a second slide at right angles to said first slide, an angular gaging member comprised of two arms having an end of each arm joined together, said gaging member further having at the free end of one arm a gaging section of convex curved outline for engaging that profile of the work piece which is to be measured and still further having on the other arm a perforation through it located in and movably transversely of the light axis of the optical system, said perforation having at least a portion of its bounding surface of the same sized and shaped curvature as the convex curved outline of said gaging section, and a handle on said gaging member for moving said gaging member in said slides with the gaging section in contact with the profile to be measured so that the travel of the perforation reproduces in said optical system the travel of the gaging section over the profile being measured.

3. In a gage for measuring a profile of a work piece and having an optical system providing a magnified indication, a gage element, including, a body having a first slide in it, a carriage movably mounted in said first slide and having in it a second slide at right angles to said first slide, an angular gaging member comprised of two arms having an end of each arm joined together, said gaging member further having at the free end of one arm a gaging section of convex curved outline for engaging that profile of the work piece which is to be measured and still further having on the other arm a circular opening therethrough located in and movable transversely of the light axis of the optical system, said opening having a portion of frusto-conical shape whose large diameter is in the direction of the oncoming light and having a portion of cylindrical shape with its bounding surface of the same size curvature as the convex curved outline of said gaging section, and a handle on said gaging member for moving said gaging member in said slides with the gaging sections in contact with the profile to be measured so that the travel of the opening reproduces in said optical system the travel of the gaging section over the profile being measured.

WILLIAM KARL LUETY.

REFERENCES CITED

The following references are of record in the file of this patent:

UNITED STATES PATENTS

| Number | Name | Date |
|---|---|---|
| 1,157,796 | Morehouse | Oct. 26, 1915 |
| 1,319,361 | Rouamet | Oct. 21, 1919 |
| 1,928,001 | Aldeborgh et al. | Sept. 26, 1933 |
| 2,035,780 | Beardsley et al. | Mar. 31, 1936 |
| 2,145,116 | Howard | Jan. 24, 1939 |
| 2,192,529 | Thomas et al. | Mar. 5, 1940 |
| 2,400,942 | Milner | May 28, 1946 |

FOREIGN PATENTS

| Number | Country | Date |
|---|---|---|
| 276,266 | Italy | Sept. 17, 1930 |